(12) United States Patent
Yang

(10) Patent No.: US 8,782,325 B1
(45) Date of Patent: Jul. 15, 2014

(54) DATA TYPE BASED ALIGNMENT OF DATA WRITTEN TO NON-VOLATILE MEMORY

(75) Inventor: Xueshi Yang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 317 days.

(21) Appl. No.: 12/700,561

(22) Filed: Feb. 4, 2010

Related U.S. Application Data

(60) Provisional application No. 61/151,005, filed on Feb. 9, 2009.

(51) Int. Cl.
*G06F 12/00* (2006.01)
*G06F 13/00* (2006.01)
*G06F 13/28* (2006.01)

(52) U.S. Cl.
USPC ............ 711/103; 711/100; 711/201; 711/202

(58) Field of Classification Search
None
See application file for complete search history.

(56) References Cited

U.S. PATENT DOCUMENTS

| | | |
|---|---|---|
| 4,747,039 A | 5/1988 | Murray |
| 2005/0172065 A1* | 8/2005 | Keays ............................ 711/103 |
| 2006/0136655 A1* | 6/2006 | Gorobets et al. .............. 711/103 |
| 2007/0255890 A1* | 11/2007 | Urata et al. .................... 711/103 |
| 2007/0271494 A1* | 11/2007 | Gorobets ....................... 714/763 |
| 2008/0126680 A1* | 5/2008 | Lee et al. ....................... 711/103 |
| 2009/0113166 A1* | 4/2009 | Houston et al. ............... 711/216 |
| 2009/0259786 A1 | 10/2009 | Lin et al. |
| 2010/0050053 A1* | 2/2010 | Wilson et al. ................. 714/773 |

OTHER PUBLICATIONS

Index from Webster's New World™ Computer Dictionary 1 page 2003 by Wiley Publishing, Inc.*
Information Retrieval from Berkshire Encyclopedia of Human-Computer Interaction 8 pages Information Retrieval. (2004). In Berkshire Encyclopedia of Human-Computer Interaction.*
File index from Dictionary of Computing 1 page (2008). In Dictionary of Computing.*
Yang, Xueshi, "Non-Volatile Memory That Includes an Internal Data Source", U.S. Appl. No. 12/696,701, filed Jan. 29, 2010, 26 pages, published by USPTO as Pub. No. 2010-0205331-A1.

* cited by examiner

*Primary Examiner* — Sanjiv Shah
*Assistant Examiner* — Marwan Ayash

(57) ABSTRACT

The present disclosure includes systems and techniques relating to data type based alignment of data written to non-volatile memory. In some implementations, an apparatus includes an input, an output, and control logic coupled with the input and the output, where the control logic is configured to modify placement of data written to a non-volatile memory based on a first data type of the data. The first data type is distinct from a second data type also written to the non-volatile memory, and the placement of the data of the first data type is modified in relation to placement of data of the second data type in the non-volatile memory.

17 Claims, 3 Drawing Sheets

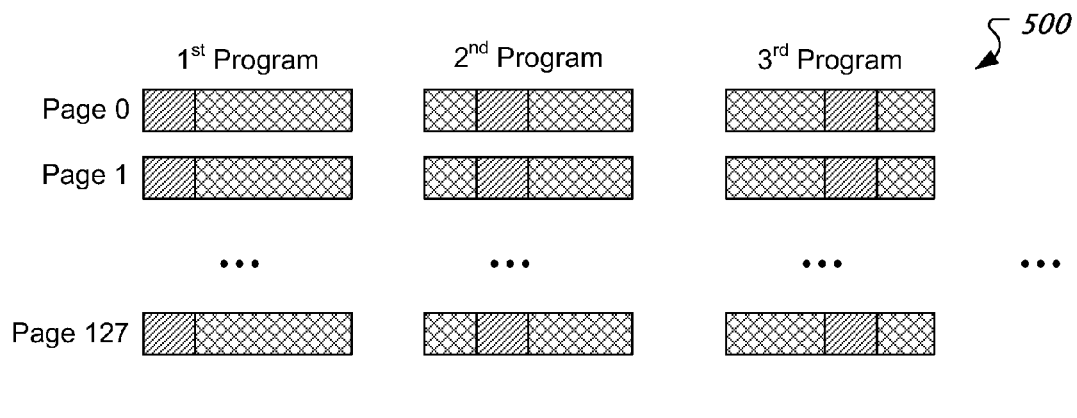
FIG. 5
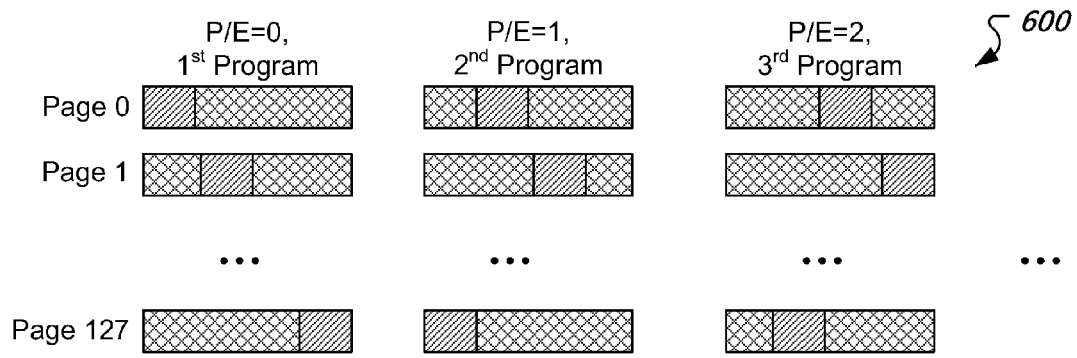
FIG. 6

DATA TYPE BASED ALIGNMENT OF DATA WRITTEN TO NON-VOLATILE MEMORY

CROSS REFERENCE TO RELATED APPLICATIONS

This application claims the benefit of the priority of U.S. Provisional Application Ser. No. 61/151,005, filed Feb. 9, 2009 and entitled "Methods for Aligning Data Among Data Sectors in Data Storage Devices".

BACKGROUND

The present disclosure describes systems and techniques relating to non-volatile memory.

Devices and systems can store or retrieve data using non-volatile memory such as flash memory. For example, a digital camera can store an image to non-volatile memory. In another example, a digital media player such as an MP3 player can read a digital audio file from non-volatile memory and play the contents of the audio file. Mobile devices such as a mobile phone or a personal digital assistant (PDA) can read data from and write data to one or more non-volatile memory. Moreover, for various storage application (e.g., using flash memory based storage devices) a user data sector is often stored in a page along with other auxiliary data such as meta data.

Devices and systems can perform multiple operations on non-volatile memory, such as reading and programming operations. Various types of programming operations can include writing and erasing data. Erasing data in such memory can include marking a data area as invalid or not programmed, or can include writing data to a data area to effect an erasure.

Non-volatile memory such as flash memory can be divided into multiple data areas. Each data area can be individually addressed and accessed. Accordingly, an operation can include obtaining an address for one or more data areas or a portion of a data area. Also, a data area can be divided into individual bits or larger aggregate data units such as bytes. In some implementations, a data area can be arranged as a data page or a data block.

SUMMARY

The present disclosure includes systems and techniques relating to data type based alignment of data written to non-volatile memory. According to an aspect of the described systems and techniques, a device includes an input configured to connect with a data processing apparatus; an output configured to connect with a non-volatile memory; and control logic coupled with the input and the output, and configured to modify placement of data written to the non-volatile memory from a first location to a second location based on a data type of the data. The data type can be a first data type that is distinct from a second data type also written to the non-volatile memory, and the placement of the data of the first data type can be modified in relation to placement of data of the second data type in the non-volatile memory. Moreover, the control logic can be configured to modify the placement of the data of the first data type based on a counter value associated with the non-volatile memory.

According to another aspect of the described systems and techniques, a method includes obtaining data to store in a non-volatile memory; determining an alignment for the data within an area of the non-volatile memory based on a data type of the data; and writing the data to the non-volatile memory in accordance with the determined alignment. The data type can be a first data type distinct from a second data type also stored in the non-volatile memory, and the non-volatile memory can include a NAND flash memory device.

The determining can include accessing a variable corresponding to the writing of the data; and assigning a start position, based on the variable, for the data within a data area corresponding to the non-volatile memory. In addition, the variable can include one or more of a program/erase count, a page index, a block index and a plane index, and the assigning can include selecting one of multiple predefined start positions.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a mobile telephone, a personal digital assistant (PDA), a mobile computer, a digital camera), a general purpose data processing apparatus (e.g., a minicomputer, a server, a mainframe, a supercomputer), or combinations of these.

Thus, according to another aspect of the described systems and techniques, a system can include input/output devices; a processor; and a solid state memory subsystem including a non-volatile memory and a controller to modify alignment of data written to the non-volatile memory based on a first data type of the data; where the first data type is distinct from a second data type stored in the non-volatile memory. Furthermore, the solid state memory subsystem can include a buffer coupled with the non-volatile memory, and the controller can modify the alignment of the data of the first data type written to the non-volatile memory by altering a location of the data of the first data type in the buffer.

The subject matter described in this specification can be implemented to realize one or more of the following potential advantages. Non-volatile memory life span can be increased. Data storage reliability can be improved and a higher level of quality of service can be provided. For example, the number of page failures over time of use can be reduced. Moreover, these improvements can be realized with minimal additional components and any corresponding additional costs.

Details of one or more implementations are set forth in the accompanying drawings and the description below. Other features, objects and advantages may be apparent from the description and drawings, and from the claims.

DRAWING DESCRIPTIONS

FIG. 5 shows an example of a systematic arrangement of data for pages in a block of non-volatile memory.

FIG. 6 shows another example of a systematic arrangement of data for pages in a block of non-volatile memory.

DETAILED DESCRIPTION

Figure 1:
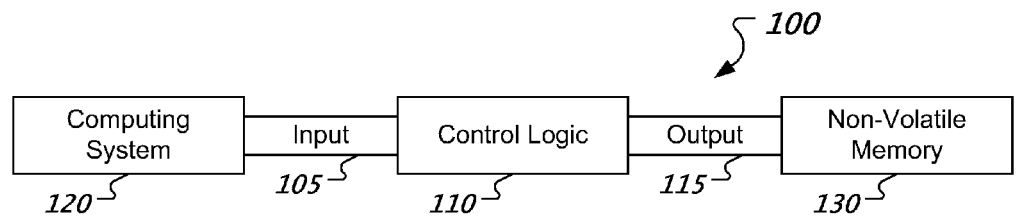
FIG. 1 shows an example of a non-volatile memory controller connected between a computing system and a non-volatile memory.

FIG. 1 shows an example of a non-volatile memory controller 100 connected between a computing system 120 and a non-volatile memory 130. The controller 100 includes an input 105 configured to connect with the computing system 120 (e.g., a connector designed to attach to a motherboard of a personal computer), and an output 115 configured to connect with the non-volatile memory 130 (e.g., a connector designed to attach to NAND flash memory or NOR flash memory). The controller 100 also includes control logic 110 configured to modify sector alignment of data written to the non-volatile memory 130 based on a first data type of the data being distinct from a second data type.

Different types of data that are concurrently written to the non-volatile memory 130 can have characteristics that result in differing impacts on the non-volatile memory 130. For example, auxiliary data that is written along with user data can differ in ways that cause different amounts of wear to a non-volatile memory device. This can be particularly true for flash memory devices, where data bit 1 and data bit 0 impose different stress to the data cell, resulting in different cell quality after consecutive erase and programming operations. By systematically modifying the alignment of data written to the non-volatile memory 130 between programming/erase operations, the impact of different data types can be effectively evened out.

The control logic 110 can include application specific integrated circuitry, a programmable microprocessor, or both. These components represent the structures that can embody and implement the functionality described herein. Other components can also be included in the controller 100, such as a charge pump, a data buffer, a program code store, etc. As will be appreciated, these various components can be implemented in one or more devices, such as one or more integrated circuit (IC) devices, including for example a NAND flash controller designed for use in both personal computers and mobile internet devices.

Moreover, such devices can be designed and manufactured to be readily installed in larger devices and systems, or designed and manufactured as integral components of such larger devices and systems. For example, the controller 100 can be part of a System-on-a-Chip (SoC) device, which can include processor(s), memory interface(s), and read-only and random access memories, as well as potentially other components. The non-volatile memory 130 can be external to the SoC, but the non-volatile memory 130 can nonetheless be combined with the SoC to form an integrated device. For example, the non-volatile memory 130 and SoC can be affixed to a single printed circuit board. In some implementations, the non-volatile memory 130 is located within a removable structure that mechanically and electrically couples with another structure that houses the controller 100 (or that houses a SoC of which the controller 100 forms a part).

Figure 2:
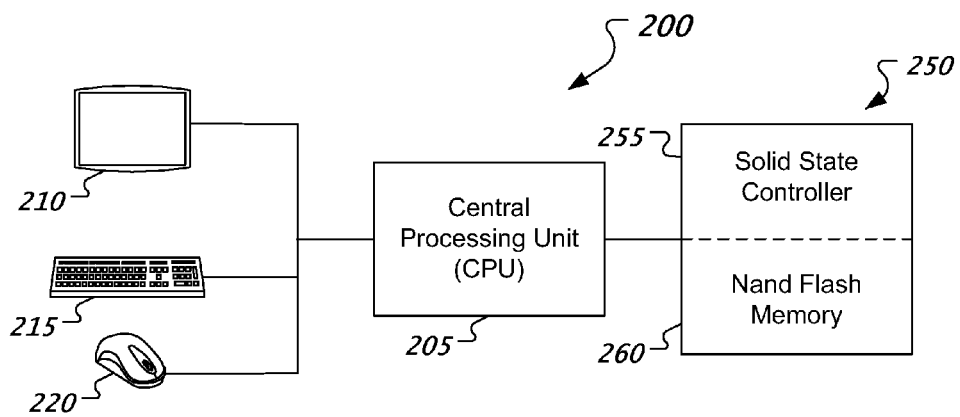
FIG. 2 shows an example of a computing system including a solid state memory subsystem.

FIG. 2 shows an example of a computing system 200 including a solid state memory subsystem 250. The system 200 includes a central processing unit (CPU) 205, a display device 210 (e.g., a CRT (cathode ray tube) or LCD (liquid crystal display) monitor), and input devices, such as a keyboard 215 and a pointing device 220 (which although shown as a mouse device in FIG. 1, can be other pointing devices). The system 200 can include one or more additional processors and one or more additional input/output devices, e.g., microphone, speakers, printer, etc.

The solid state memory subsystem 250 includes a solid state controller 255 and a NAND flash memory 260. The NAND flash memory 260 can be a single-level cell (SLC) devices or a multi-level cell (MLC) device. The solid state memory subsystem 250 can include control logic as described herein, which can be designed to allow the solid state memory subsystem 250 to load operating system and applications software into the system 200 more quickly.

As will be appreciated, the system 200 represents a desktop personal computer, which can include many other devices and subsystems that are not shown, such as a hard disk drive, a network interface, a motherboard, etc. However, this is only one example of a larger system in which the presently disclosed subject matter can be implemented. Other examples of such larger devices and systems include smart phones, netbooks, media players, laptops, notebooks, diskless sub-notebooks, and ultra-slim drives that fit into a PCI ExpressCard, PCIeMini slot on a laptop or PCIe slot on a desktop, while appearing as just another drive.

However, irrespective of these specific examples, it will be appreciated that the subject matter described herein can be made compatible with many different types of computing systems 120. In addition, the non-volatile memory 130 can include many different types of solid state storage devices that are able to maintain their data without any external source of power. Such devices can include flash memory devices, such as a BIOS chip, CompactFlash, SmartMedia, a memory stick, PCMCIA Type I and Type II memory cards, and memory cards for video game consoles. Such devices can also include phase change memory devices.

Figure 3:
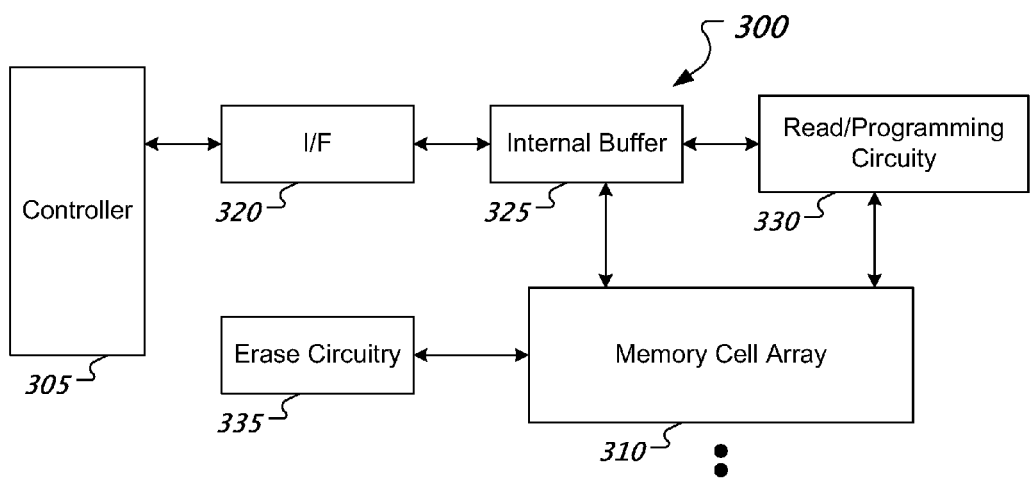
FIG. 3 shows an example of a flash memory architecture.

FIG. 3 shows an example of a flash memory architecture 300. A controller 305 connects with a controller interface (I/F) 320 to manage the transfer of data from an external source into an internal buffer 325. The internal buffer 325 can be random access memory used as a temporary storage location before commencement of programming a memory cell array 310. Read/programming circuitry 330 can be used to write data from the internal buffer 325 to the memory cell array 310 and to read data out of the memory cell array 310. Erase circuitry 335 can be used to erase data from the memory cell array 310. In addition, as will be appreciated, more than one memory cell array 310, and additional data control/management circuitry, can be included in the flash memory architecture 300.

The data that is put into the internal buffer 325, before being programmed into the memory cell array 310, can be entirely from the external source or partially from an internal source (e.g., a flash device component that provides buffer format data, such as all ones, when the user data to be programmed is smaller than the available page size). In any case, the data to be programmed is of different types, which can have different characteristics. Examples of different types of data include user data, meta data (either external or controller specified), format data, nuisance data, etc. Nuisance data can be data programmed into the memory but that does not affect or that is not affected by user data. For further details regarding such, see U.S. patent application Ser. No. 12/696,701 to Xueshi Yang, filed on Jan. 29, 2010, and entitled, "NON-VOLATILE MEMORY THAT INCLUDES AN INTERNAL DATA SOURCE".

Figure 4:
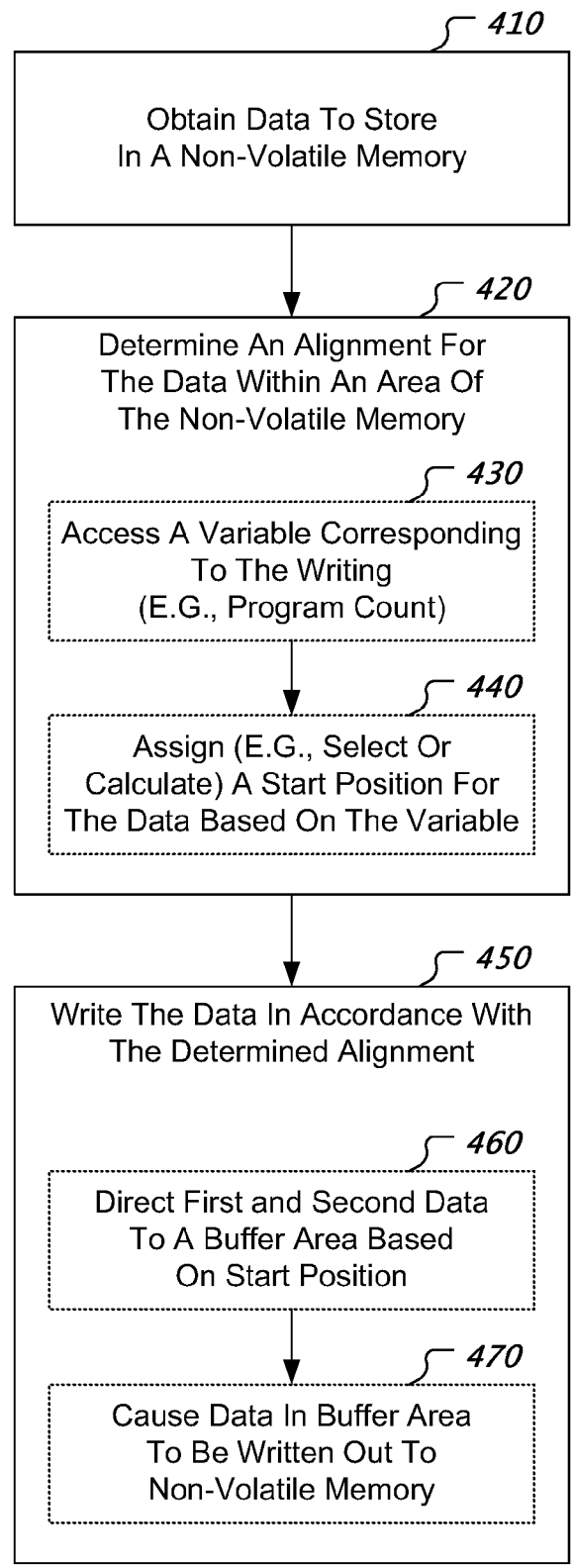
FIG. 4 shows an example of a process used to align data written to a non-volatile memory.

FIG. 4 shows an example of a process used to align data written to a non-volatile memory. At 410, data to be stored in a non-volatile memory is obtained. This can involve receiving the data from an external source, generating the data, receiving an indication that the data is available, or a combination of these.

At 420, an alignment for the data within an area of the non-volatile memory is determined based on a first data type of the data, where the first data type is distinct from a second data type also stored in the non-volatile memory. For example, second data of the second data type can be user data, and first data of the first data type can be auxiliary data associated therewith. Note that the designations of "first" and "second" with respect to the data and the types thereof have no significance with respect to either order or priority for the data.

At 450, the data is written to the non-volatile memory in accordance with the determined alignment. Note that the operations described herein can be performed by various components shown and described above in connection with FIGS. 1-3. For example, the operations shown in FIG. 4 can be performed by the controller 305, the read/programming circuitry 330, or a combination of these.

Thus, the writing of the data can involve, at 460, directing first data of a first data type and second data of a second data type to the internal buffer 325 in accordance with the determined alignment (e.g., in accordance with a selected start position), and at 470, causing data in the internal buffer 325 to be written out, in order, to the memory cell array 310. Alternatively, the change in alignment can happen between the buffer 325 and the memory cell array 310. Moreover, in some implementations, an internal buffer need not be used (i.e., the architecture of FIG. 3 is entirely optional).

Determination of an alignment for the data can be accomplished in any of multiple different systematic manners of modifying placement of the data written to the non-volatile memory. For example, at 430, determining the alignment can include accessing a variable corresponding to the writing of the data. This variable can include a program count, such as a program/erase cycle count, which can be maintained for a page of flash memory. Note that firmware used in conjunction with accessing data areas of a non-volatile memory can be employed to keep track of one or more program/erase cycle count variables.

Determining the alignment can further include, at 440, assigning a start position, based on the variable, for the data within a data area corresponding to the non-volatile memory. Assigning the start position can involve selecting one of multiple predefined start positions, calculating the start position based on the variable and a value associated with the data area corresponding to the non-volatile memory, or a combination of these. Detailed examples of such determinations will now be described in connection with FIGS. 5 and 6.

FIG. 5 shows an example of a systematic arrangement 500 of data for pages in a block of non-volatile memory. Two types of data are shown: data-A and data-B. The location of data-A and data-B can be arranged in a physical page in a systematic way by obtaining the program/erase count of the current page and determining the start and end positions for data-A and data-B from the program/erase count.

As shown in this example, data-A is one fourth of the physical page size and data-B is three quarters of the physical page size. Many variations of this allotment are also possible. For example, data-A may take more or less of each page, or data-A may vary in the amount of space in each page it takes up.

For each of pages 0, 1, . . . 127 in the example of FIG. 5, data-A is systematically arranged with respect to data-B in a block as shown, where the placement of data-A depends on how many program operations have been performed. This data allocation can be implemented by identifying the starting point of data-A based on a program/erase (P/E) count in accordance with the following:

(1) Compute x=remainder of (P/E count)/4;
when x==0, start at 0;
when x==1, start at ¼ of a page;
when x==2, start at ½ of a page;
when x==3, start at ¾ of a page.

Data-B then occupies the remaining space.

In this example, there are 128 pages per block, and all the pages of a block are erased simultaneously, so each page has the same P/E count. However, in other situations there can be different counter values for the different pages since some pages may be skipped in a given program. Nonetheless, it should be appreciated that different counters can be used to generate the systematic arrangement of data based on data type, either on a block basis, a page basis, or other bases, such that over time the different types of data are spread out over the different memory cells.

In some implementations, selecting an alignment for the data that is the same across multiple pages (as shown in FIG. 5) can be advantageous. For example, this arrangement can provide advantages when used with MLC flash memory devices. In MLC flash memory devices, a flash cell stores more than one bit of data. For example, a flash cell can store two data bits. For program and read throughput and practical circuit design reasons, it is often a practice to distribute the bits in one flash cell into different pages. For a 2 bits/cell example, the MSB bit and LSB bit are in two separate pages.

More specifically, a data page can consist of either all LSB bits or all MSB bits from a wordline of cells. To minimize wear, a cell prefers to stay in the erase state, which is the case when both the LSB bit and MSB bit are logical 1. Consequently, if data types are aligned, location-wise, across the pages stored in the same wordline of cells, maximum benefits can be obtained. Alternatively, the alignment determined for the data need not be identical across multiple pages.

FIG. 6 shows another example of a systematic arrangement 600 of data for pages in a block of non-volatile memory. In this example, in addition to the program/erase count, the page number is also used as a variable in determining an alignment for data-A within a given page. This data allocation can be implemented by identifying the starting point of data-A in accordance with the following:

(2) Compute x=remainder of (P/E count)/4;
Compute y=remainder of (page index)/4;
Start data-A=¼ of (remainder of (x+y)/4).

Thus, when P/E count==2 and page index==1, x is 2, y is 1, and the starting point of data-A is ¾ position of the physical page.

In addition to the page index (or in the alternative), the allocation determination can also depend on a block index, a plane index, one or more other variables, or some combination of these. Various calculations can be employed to align the different data types within the memory such that the allocation varies systematically with the physical locations of the memory where the user data is programmed, and wear on the memory is evened out over time. The determination of data alignment can be implemented as any of multiple different rotational, deterministic functions that depend on one or more variables, such as P/E cycle, page index, block index, etc. For example, the same calculations described above can be used, but modified such that the start point of data-A is changed every two P/E cycles rather than every P/E cycle.

A few embodiments have been described in detail above, and various modifications are possible. For example, additional data types can be included in different implementations. In addition, alternative processes can be used to select or calculate how to relocate one type of data with respect to another type of data.

For example, data-A can be user data, and data-B can be empty. In other words, the user data page is smaller than the physical flash memory page size. In such cases, the programming logic would only program the portion corresponding to the locations covered by data-A while skipping the locations of data-B.

The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

While this disclosure contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A device comprising:
   an input configured to connect with a data processing apparatus;
   an output configured to connect with a non-volatile memory; and
   control logic coupled with the input and the output, and configured to modify placement of data written to the non-volatile memory from a first location to a second location of a plurality of locations in the non-volatile memory based on a data type of the data, wherein the placement moves through all locations of the plurality of locations to even out wear, and the control logic is configured to modify the placement of the data from the first location to the second location by modifying an alignment of the data from a first start position of a page of the non-volatile memory to a second, different start position of the same page of the non-volatile memory, and identify the second, different start position of the page by calculating the second, different start position of the page based on (i) a first remainder of a program/erase count divided by a size of the page in relation to a size of the data and (ii) a second remainder of a page index divided by the size of the page in relation to the size of the data.

2. The device of claim 1, where the data type is a first data type that is distinct from a second data type also written to the non-volatile memory, and the placement of the data of the first data type is modified in relation to placement of data of the second data type in the non-volatile memory.

3. The device of claim 1, where the control logic is configured to modify the placement of the data of the data type based on a counter value associated with the non-volatile memory.

4. The device of claim 1, where the control logic is configured to modify the placement of the data of the data type in a same manner across multiple pages of a block in the non-volatile memory.

5. The device of claim 1, where the control logic is configured to modify the placement of the data of the data type further based on a block index or a plane index.

6. A method comprising:
   obtaining data to store in a non-volatile memory;
   determining an alignment for the data within an area of the non-volatile memory based on a data type of the data, wherein determining the alignment comprises modifying placement of the data from a first location to a second location of a plurality of locations in the non-volatile memory, the placement moves through all locations of the plurality of locations to even out wear, and modifying the placement of the data from the first location to the second location comprises modifying the alignment of the data from a first start position of a page of the non-volatile memory to a second, different start position of the same page of the non-volatile memory, and identifying the second, different start position of the page by calculating the second, different start position of the page based on (i) a first remainder of a program/erase count divided by a size of the page in relation to a size of the data and (ii) a second remainder of a page index divided by the size of the page in relation to the size of the data; and
   writing the data to the non-volatile memory in accordance with the determined alignment.

7. The method of claim 6, where the determining comprises:
   accessing a variable corresponding to the writing of the data, wherein the variable comprises one or more of a block index or a plane index; and
   assigning the second start position, based on the variable, for the data within a data area corresponding to the non-volatile memory.

8. The method of claim 7, where the assigning comprises selecting one of multiple predefined start positions.

9. The method of claim 7, where the assigning comprises calculating the second start position based on the variable and a value associated with the data area corresponding to the non-volatile memory.

10. The method of claim 7, where the data type is a first data type distinct from a second data type also stored in the non-volatile memory, the data comprises first data of the first data type, and the writing comprises:
  directing the first data to a buffer area in accordance with the second start position;
  directing second data of the second data type to a remaining portion of the buffer area; and
  causing data in the buffer area to be written to the non-volatile memory.

11. The method of claim 6, where the non-volatile memory comprises a NAND flash memory device.

12. A system comprising:
  input/output devices;
  a processor; and
  a solid state memory subsystem comprising:
    a non-volatile memory, and
    a controller to modify alignment of data written to the non-volatile memory based on a first data type of the data, wherein the controller modifies the alignment by modifying placement of the data from a first location to a second location of a plurality of locations in the non-volatile memory, the placement moves through all locations of the plurality of locations to even out wear, and the controller modifies the placement of the data from the first location to the second location by modifying the alignment of the data from a first start position of a page of the non-volatile memory to a second, different start position of the same page of the non-volatile memory, and identify the second, different start position of the page by calculating the second, different start position of the page based on (i) a first remainder of a program/erase count divided by a size of the page in relation to a size of the data and (ii) a second remainder of a page index divided by the size of the page in relation to the size of the data;
    where the first data type is distinct from a second data type stored in the non-volatile memory.

13. The system of claim 12, where the controller modifies the alignment of the data of the first data type in identical fashion across multiple pages of the non-volatile memory.

14. The system of claim 13, where the non-volatile memory comprises a multi-level cell (MLC) device comprising the pages.

15. The system of claim 12, where data of the second data type is user data.

16. The system of claim 12, where the non-volatile memory comprises a NAND flash memory device.

17. The system of claim 12, where the solid state memory subsystem comprises a buffer coupled with the non-volatile memory, and the controller modifies the alignment of the data of the first data type written to the non-volatile memory by altering a location of the data of the first data type in the buffer.

* * * * *